(12) United States Patent  (10) Patent No.: US 8,506,199 B2
Rump et al.  (45) Date of Patent: Aug. 13, 2013

(54) TIE ROD

(75) Inventors: Stefan Rump, Rehden (DE); Andreas Rosengarten, Bad Iburg (DE); Dirk Sokolihs, Bramsche (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/255,581

(22) PCT Filed: Mar. 11, 2010

(86) PCT No.: PCT/DE2010/050009
§ 371 (c)(1),
(2), (4) Date: Sep. 20, 2011

(87) PCT Pub. No.: WO2010/102617
PCT Pub. Date: Sep. 16, 2010

(65) Prior Publication Data
US 2012/0003032 A1   Jan. 5, 2012

(30) Foreign Application Priority Data
Mar. 13, 2009  (DE) .......................... 10 2009 001 535

(51) Int. Cl.
*F16B 7/06* (2006.01)
(52) U.S. Cl.
USPC .......................... 403/43; 403/45; 280/124.153
(58) Field of Classification Search
USPC ............... 403/43–46; 280/124.125, 124.153, 280/124.166, 124.107, 86.756, 86.757; 411/224, 226, 432
See application file for complete search history.

(56) References Cited

U.S. PATENT DOCUMENTS

| 925,448 | A | * | 6/1909 | Boyden | 174/161 R |
| 1,288,812 | A | * | 12/1918 | Bishop | 411/238 |
| 1,374,963 | A | * | 4/1921 | Stevenson | 403/44 |
| 1,480,253 | A | * | 1/1924 | Fisher | 403/44 |
| 1,550,672 | A | * | 8/1925 | Breeze | 403/75 |
| 2,340,300 | A | * | 2/1944 | Booth et al. | 403/46 |
| 2,678,226 | A | * | 5/1954 | White | 403/46 |
| 3,239,930 | A | * | 3/1966 | Violleau | 29/516 |
| 3,291,090 | A | * | 12/1966 | Sevey | 114/109 |
| 3,454,293 | A | * | 7/1969 | Howlett | 403/44 |
| 3,938,822 | A | * | 2/1976 | Guerriero | 280/86.758 |

(Continued)

FOREIGN PATENT DOCUMENTS

| DE | 77 32 250 U1 | 2/1978 |
| DE | 296 08 677 U1 | 9/1996 |

(Continued)

*Primary Examiner* — Joshua Kennedy
(74) *Attorney, Agent, or Firm* — Davis & Bujold, PLLC (57) ABSTRACT

A structural unit, e.g., a tie rod, that has a tube which is provided with an internal thread, on at least one surface thereof, which is threaded in a first rotational direction, and into the end of which a threaded sleeve is screwed. The threaded sleeve has an internal thread which is threaded in a second direction, opposite to the first rotational direction, and has a shank screwed into the sleeve. The entire threaded sleeve is accommodated within the tube, and the threaded sleeve has a coupling contour on the opening side of the tube. A method of applying the structural unit such that, by rotating the threaded sleeve within the tube, the shank and the tube are moved in opposite directions. In the method, the coupling contour of the threaded sleeve serves to introduce the torque required for rotational motion of the threaded sleeve by way of a tool or an adapter.

18 Claims, 10 Drawing Sheets

(56) References Cited

U.S. PATENT DOCUMENTS

| | | | |
|---|---|---|---|
| 4,081,219 A * | 3/1978 | Dykmans | 403/43 |
| 4,097,163 A * | 6/1978 | Dubuque | 403/274 |
| 4,198,174 A * | 4/1980 | Borowiec et al. | 403/44 |
| 5,765,957 A * | 6/1998 | Connell | 403/46 |
| 6,131,494 A | 10/2000 | Quenneville | |
| 6,579,025 B1 | 6/2003 | Sokolihs et al. | |
| 6,698,969 B2 | 3/2004 | Paduano et al. | |
| 6,902,342 B1 | 6/2005 | Ditzler | |
| 7,163,216 B2 * | 1/2007 | McLaughlin | 280/93.51 |
| 7,552,913 B1 * | 6/2009 | Amoss et al. | 254/235 |
| 7,588,386 B2 * | 9/2009 | Kielczewski et al. | 403/408.1 |
| 2005/0044985 A1 | 3/2005 | Beattie | |

FOREIGN PATENT DOCUMENTS

| | | |
|---|---|---|
| DE | 199 00 264 A1 | 7/2000 |
| DE | 102 11 066 A1 | 9/2002 |
| GB | 1 146 315 | 3/1969 |
| WO | 2008/027476 A2 | 3/2008 |

* cited by examiner

TIE ROD

This application is a National Stage completion of PCT/DE2010/050009 filed Mar. 11, 2010, which claims priority from German patent application serial no. 10 2009 001 535.3 filed Mar. 13, 2009.

FIELD OF THE INVENTION

The invention relates to a tie rod.

BACKGROUND OF THE INVENTION

DE 199 00 264 A1 describes, using a tie rod for a motor vehicle as an example, a structural unit comprising a tube which is provided on at least one side with an internal thread which turns in a first direction of rotation, wherein a threaded sleeve having a corresponding external thread is screwed into the end of the tube. A shank of a ball joint is screwed into this threaded sleeve. For this purpose, the shank has an external thread which turns in the direction opposite to the first direction of rotation and corresponds to the internal thread of the threaded sleeve. By moving the threaded sleeve, which has a key surface extending out of the open end of the tube for attaching a tool for this purpose, the tube and the shank can be moved relative to each other in the axial direction. This means that rotating the threaded sleeve causes the tube and the shank to move towards each other or away from each other. This condition is brought about by the threads which progress in opposing directions. This adjustment mechanism can be used to adjust the length of the structural unit, which is significant with regard to adjusting the track of the vehicle, in particular in the case of the example of a tie rod for motor vehicles presented in the document. In the case of the solution according to DE 199 00 264 A1, it is disadvantageous, however, that the threaded sleeve extends out of the open end of the tube. In this section at least, when used in motor vehicles in particular, there is a risk that corrosion can occur on the free end of the threaded sleeve due to damage or improper handling when adjusting the length of the structural unit. The fundamental risk therefore also exists that this corrosion will expand to the adjacent components, thereby causing the structural unit to become untight or, possibly, permanently unusable.

Document DE 77 32 250 U1 describes a structural unit that is designed similarly to the previously described tie rod and likewise enables the threaded sleeve to be adjusted via a key surface provided for this purpose, and therefore the shank and the tube can move relative to each other in the axial direction.

A disadvantage of this solution, however, is that both the tube and the threaded sleeve screwed into it each comprise at least one longitudinal slot which enables moisture or contaminants to enter the interior of the structural unit, in particular when the structural unit is used in a motor vehicle. An increased load on the threaded regions caused by the foreign substances entering them cannot be ruled out entirely, and there is a potential risk of premature wear or premature ageing of the structural unit and, therefore, there is a risk that functionality will be limited, at the least.

SUMMARY OF THE INVENTION

A problem addressed by the invention is that of providing a structural unit comprising a tube and a shank having a threaded sleeve disposed therebetween, using which a length setting between the tube and the shank can be attained by rotating the threaded sleeve, wherein this structural unit should be reliably protected against penetration by moisture and contaminants.

Moreover, a method for the use of such a structural unit and at least one suitable tool for carrying out the method should be provided.

Furthermore, a tie rod for motor vehicles, in particular for commercial vehicles, should be provided, which should ensure that the problem is solved for the aforementioned structural unit, and should ensure that a clamped connection which is constant and can be reproduced using a reliable process exists between the tube, the shank, and the threaded sleeve disposed therebetween.

A structural unit comprising a tube which is provided on at least one side with an internal thread which turns in a first direction of rotation, and into the end of which a threaded sleeve is screwed, wherein the threaded sleeve has an internal thread which turns in the direction opposite to the first direction of rotation and has a shank screwed therein, was developed according to the invention in such a way that the entire threaded sleeve is accommodated in the end section of the tube, and the threaded sleeve has a coupling contour on the opening side of the tube.

Given that the entire threaded sleeve is accommodated in the end section of the tube, a structural unit that is reliably protected against penetration by contaminants, and is therefore protected against corrosion, is created using simple means. The coupling contour provided on the threaded sleeve makes it possible to adjust the length of the tube relative to the shank using the threaded sleeve. Additional sealing measures on the opening side of the tube can be provided on the current structural unit according to the invention. This is not absolutely necessary, however, since the threaded sleeve is still accommodated in the tube in a protected manner anyway.

According to a first embodiment of the invention, the coupling contour of the threaded sleeve forms a tool placement surface or tool engagement surface. In this simple manner, it is possible to couple a tool, through the opening side of the tube, with the coupling contour of the threaded sleeve and rotate the threaded sleeve within the tube.

Furthermore, it is advantageously possible to rotate the threaded sleeve within the structural unit since the coupling contour of the threaded sleeve is a contour for the mutual, form-locking engagement of the threaded sleeve with an adapter. The tool and/or the adapter can therefore be permanently attached to the structural unit both in the case of the tool-dependent solution, and in the case of an embodiment comprising an adapter. However, it is also possible to remove the adapter and/or the tool from the structural unit once the length of the structural unit has been set. In either case, it is relatively easy to perform the required or desired length adjustment of the structural unit according to the invention.

Of the large number of possible variant embodiments of the coupling contour of the threaded sleeve, it has proven particularly advantageous for the threaded sleeve to have, as the coupling contour, at least one slot-shaped recess and/or at least one pin formed on the threaded sleeve and/or a section having a polygonal contour. Depending on the coupling contour that is selected, and corresponding thereto, a suitable adapter or a tool that can be used accordingly must be selected, using which the threaded sleeve can be rotated within the tube in order to perform the desired length adjustment of the structural unit according to the invention.

In a special embodiment of the adapter, the adapter can be displaced between the shank and the tube in a thread-independent manner, for example. In this manner, the adapter can be placed on the corresponding coupling contour of the threaded sleeve only for the period of time during which the length of the structural unit is adjusted, for example. Given that the adapter can be moved into the tube and out of the tube in a thread-independent manner, it is furthermore possible—as mentioned above—to remove the adapter from the structural unit entirely. For this purpose and, much more significantly, to enable implementation of the solution according to the invention, the adapter can be used independently of the threads of the threaded sleeve of the tube and of the shank, which are operatively interconnected.

Proceeding from the idea of the above-described embodiment of the invention, the adapter can be displaced between the shank and the tube, for example, in that the outer dimensions of the adapter are smaller, at least in sections, than the inner diameter of the internal thread of the tube, and the inner dimensions of the adapter are greater across the entire length of the adapter than the outer diameter of the external thread of the shank.

In this special manner, the adapter can be moved back and forth without it being dependent on the available thread for this purpose. Therefore, if the end of the tube of the structural unit has a circular cross section, for example, the outer diameter of the adapter would be smaller than the inner diameter of the internal thread of the tube, at least in a main section. The limitation of this dimension of the adapter to one section is based on the condition that it should be possible to limit the adjustment travel of the structural unit. Conversely, the inner diameter of the adapter is greater than the outer diameter of the external thread of the shank. In this case, however, the inner diameter of the adapter must be greater along the entire length in order to permit free, path-independent displacement on the shank.

According to another proposal according to the invention, the adapter is fixedly connected to a sleeve which is screwed onto an external thread of the tube, wherein the sleeve has a tool placement surface on the external peripheral surface thereof in order to move the adapter directly via the sleeve and thereby transfer the rotational motion to the threaded sleeve. This variant, which has a slightly more complex design, is very easy to handle and is therefore advantageous.

Once the structural unit has been adjusted to the necessary length, the components must be fixed relative to one another. Different possible solutions for this are provided in the prior art. According to a particularly simple variant embodiment, the adapter or the component connection between tube and shank is fixed using a locknut. This locknut can be screwed directly onto the external thread of the shank. The use of a locknut has a further. A sealing effect can be simultaneously achieved therewith. By fixing the structural unit using a locknut, the open end of the tube is closed, thereby easily preventing penetration by moisture and contaminants.

These measures can be enhanced multifold when, according to a further proposal of the invention, a self-locking locknut is used as the locknut. The self-locking effect is usually attained via a plastic lining within the thread of the nut, and therefore an additional sealing effect can be attained when such a locknut is used for fastening.

In the sense according to the invention, the locknut serves to directly or indirectly seal the end of the tube. An indirect seal exists, for instance, when an adapter is provided between the locknut and the end of the tube. A direct seal by the locknut exists when the locknut rests directly against the opening of the end of the tube.

At this point, a further and very essential advantage of the solution according to the invention becomes clear. In an advantageous manner, the assemblies under discussion here are suited for use in particular, for example, on tie rods in motor vehicles, as described above in conjunction with the explanation of the prior art. To fix the individual components relative to each other, collar clamps are used which are currently placed onto the end of the tube and screwed down using considerable force, thereby fixing the components relative to one another in a clamping manner. To increase elasticity and enable such clamping to occur, the known solutions comprise at least one slot in the end of the tube and in the threaded sleeve extending out of the tube. As explained initially, it is due precisely to these slots that contaminants and moisture can hardly be prevented from entering the interior of the structural unit. This condition is also accounted for in the solution according to the invention. Since the entire threaded sleeve is accommodated in the end of the tube and the individual parts are fixed using a locknut, the components of the structural unit are loaded against one another and fastened in this manner, and therefore additional collar clamps on the outer circumference of the tube are no longer necessary. As a result, however, the previously mentioned slots can also be avoided, thereby reducing the number of required components and reducing the production effort required for a structural unit according to the invention, and providing a greatly improved seal. The seal was therefore simplified overall, and was associated with the fastening of the components of the structural unit.

To enable a counterforce on the tube to be generated during the displacement movement of the threaded sleeve, a further proposal of the invention provides that a tool placement surface is formed on the external peripheral surface of the tube. In this simplest case, this can be a key surface which is used for the placement of an open-end wrench.

Since the length of the structural unit is usually adjusted manually, it is practical to provide a scale on the external peripheral surface of the tube for use by the user who will perform the adjustment. The scale can be formed by markings. A plurality of markings that indicate the extent of the adjustment movement is therefore preferably provided on the external peripheral surface of the tube. It is therefore possible—in the case of the example of a tie rod for motor vehicles—to set the same length value exactly on both sides, for example.

To prevent the case in which, due to erroneous operation of the structural unit according to the invention, the threaded sleeve is screwed into the tube too far and the components are separated, for instance, an expedient embodiment of the invention provides that the internal thread of the tube has a limited length in order to reduce the axial travel of the threaded sleeve. By way of this simple measure, the threaded sleeve can be prevented from being screwed in too far. The threaded sleeve reaches a stop at the end of the internal thread of the tube, at the latest, and cannot be moved further. The threaded sleeve can therefore be prevented from coming loose from the shank. Furthermore, the operator notices the error that was caused, and can now rotate the threaded sleeve out of the tube.

Furthermore, according to a further development of the invention, the threaded sleeve comprises a blocking element through which the shank extends to limit the adjustment travel, and which is accommodated in a groove present in the external peripheral surface of the shank such that the axial displacement thereof is limited, and is inserted into a groove formed in the internal peripheral surface of the threaded sleeve. Preferably, the grooves extend circumferentially along the external peripheral surface of the shank and along the internal peripheral surface of the threaded sleeve. This variant constitutes a particularly simple production possibility. For example, the threaded sleeve can be manufactured together with the blocking element as a prefabricated structural unit. Assembly is simplified overall. The blocking element is inserted into the groove in the internal peripheral surface of the threaded sleeve without axial play, but with clearance in the radial direction. The radial play within the groove for receiving the blocking element makes it possible to use the inherent elasticity of the blocking element, which is significant for the assembly of the structural unit. To simplify this assembly of the blocking element, the shank can comprise a mushroom-cap-shaped end piece, the outer dimensions of which are greater than the inner diameter of a through opening in the blocking element. When the structural unit is assembled, the shank is inserted, via the end piece thereof, into the through opening of the blocking element which, due to the inherent elasticity thereof, expands in the radial direction within the groove in the threaded sleeve and can be guided over the end piece of the shank. After passing over the end piece of the shank, the blocking element contracts due to the inherent elasticity thereof and therefore approximately has a through opening that corresponds to the circumference of the external peripheral surface of the groove within the shank. The blocking element therefore now rests in the groove of the shank directly against the surface of the groove. The groove of the shank preferably has two lateral contact flanges that limit the axial travel. The contact flanges serve as a stop for the blocking element.

With this solution, undesired loosening of the individual parts of the structural unit presented herein can be securely and reliably prevented. The available, limited axial adjustment travel of the components relative to each other is defined by this embodiment in a simple manner. Due to the fact that the shank penetrates the blocking element, the blocking element can be disposed within the structural unit. Consequently, the blocking element is protected from mechanical, thermal and chemical influences, thereby constituting a reliable safeguard which is guaranteed for the entire service life of the structural unit. This solution has further advantages, however, such as the prevention of improper adjustment movement of the structural unit, or the simple design thereof.

According to one possible application of a structural unit according to the invention, the structural unit is a component of a tie rod for motor vehicles, and the shank comprises a ball joint housing on the end.

According to the method according to the invention for the use of a structural unit, the shank and the tube are moved in opposite directions by rotating the threaded sleeve within the tube, wherein the coupling contour of the threaded sleeve serves to introduce the torque required for the rotational motion of the threaded sleeve by way of a tool or an adapter. An adapter or a tool is always required for the method because the threaded sleeve is screwed into the end of the tube.

A first tool for the application of the method is characterized, according to the proposal, in that the tool comprises a handle and a key surface having a cycloidal recess which is semicircular at most, for example, for placement onto the external thread of the shank, and at least one pin which extends perpendicularly away from the key surface and is complementary to the coupling contour. Once the locknut has been completely loosened, this manually operated tool is placed onto the external thread of the shank via the cycloidal recess. The at least one pin provided on the key surface of the tool then engages in the coupling contour of the threaded sleeve. Preferably, however, a plurality of pins are provided to attain a better distribution of the force that is introduced. Once the tool has been placed on the coupling contour, it rests on the thread of the shank and can be rotated using the handle thereof, wherein the tool moves the threaded sleeve via the pins and the coupling contour.

Moreover, there are further possibilities for the design of a tool that is suitable for the invention. According to another proposal, for example, the tool comprises a cycloidal recess which is semicircular at most, for example, for placement onto the external thread of the shank on the inner side thereof, a tool placement surface on the outer contour thereof, and at least one pin which extends perpendicularly away from the circumference of the recess and is complementary to the coupling contour. This tool is therefore not manually operated, but rather is placed onto the external thread of the shank via the cycloidal recess, and is then moved in the axial direction along the shank toward the coupling contour of the threaded sleeve, whereby the pin present on the tool and the coupling contour become engaged. Next, another tool can be placed on the tool placement surface provided on the outer contour of the tool, and can be used to adjust the threaded sleeve. In the simplest case, a tool placement surface designed similarly to a hexagonal nut is provided, thereby making it possible for an open-end wrench to be placed on the external peripheral surface of the tool and used to adjust the threaded sleeve. Greater forces can be transmitted using this solution than is possible using a manually operated tool.

A tie rod for motor vehicles is protected, the variant embodiments of which relate to those related to the structural unit described. It is a tie rod for motor vehicles, in particular for commercial vehicles, comprising a tube which is provided on at least one side with an internal thread which turns in a first direction of rotation, and into the end of which a threaded sleeve is screwed, wherein the threaded sleeve has an internal thread which turns in the direction opposite to the first direction of rotation and has a shank of a ball joint housing screwed therein. The entire threaded sleeve is accommodated in the end section of the tube, and the tube is fastened to the shank of the ball joint housing, which is screwed into the threaded sleeve, exclusively via axial clamping using a locknut.

The axial clamping of the components results in a number of advantages. According to the prior art, the tube, threaded sleeve, and shank are clamped after the shank of the ball joint housing is adjusted by radially compressing the slotted tube end and the slotted threaded sleeve using a clamp which is tightened using an attachment screw. In the installed state, the clamp encloses the slotted tube end, the slotted threaded sleeve, and the shank of the ball joint housing.

To enable the clamp to be installed, the tube end must be tapered relative to the original diameter, which constitutes additional complexity.

In addition, the embodiment according to the prior art results in great differences in the clamping effect, in some cases, when implemented in series production. These differences are due, inter alia, to the use of collar clamp which is subject to tolerances and has deviations in the thickness of the material, in the roughness of surfaces that are in contact with the parts to be joined, and other fluctuations of functional dimensions. Further differences in the clamping effect are caused by the attachment screw, the properties of which can fluctuate in series production. Furthermore, the exact same amount of clamping force cannot be reproduced especially when the attachment screw is retightened several times. Moreover, fluctuations in the clamping force can result due to the type of joining of the attachment screw. Experiments have shown that tightening the nut or the screw bolt of the attachment screw using the same torque results in different clamping forces.

In all, the axial clamping of tube, threaded sleeve, and shank results in a clamping effect that is more constant and process-reliable than is the case when collar clamps according to the prior art are used. This is due mainly to the fact that fewer components or parts to be joined interact in the case of axial clamping, thereby reducing the possibilities for influencing the joining force that connects the components.

The invention is described in the following in greater detail with reference to the attached drawings. The example embodiments shown do not limit the invention to the variants shown, but rather serve merely to explain the principle of the invention. In order to illustrate the mode of operation according to the invention, only highly simplified schematic representations are shown in the figures, in which components that are not essential to the invention have been omitted. This does not imply, however, that such components would not be present in a solution according to the invention.

BRIEF DESCRIPTION OF THE DRAWINGS

In the drawings:

FIG. 6: shows the section line VI-VI from FIG. 5, FIG. 7: shows a fourth possibility for a structural unit according to the invention, in a sectional view.

DETAILED DESCRIPTION OF THE PREFERRED EMBODIMENTS

Figure 1:
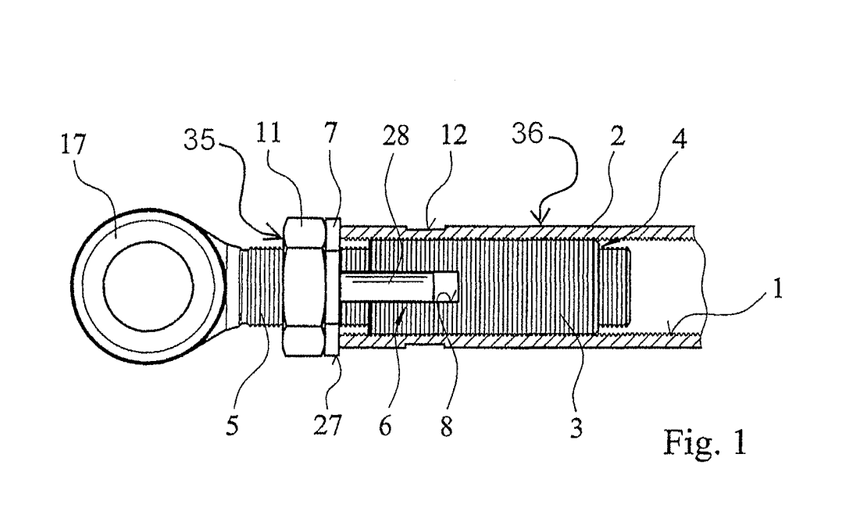
FIG. 1: shows a sectional view of a first variant embodiment of a structural unit according to the invention.

FIG. 1 shows, using the end piece of a tie rod for a motor vehicle as an example, a structural unit according to the invention in a first variant embodiment in a sectional view and in a simplified depiction. The structural unit comprises a tube 2 which is provided with an internal thread 1 which turns in a first direction of rotation, and into the end of which a threaded sleeve 3 is screwed. The threaded sleeve 3 has an internal thread 4 which turns in the direction opposite to the first direction of rotation. A shank 5 is screwed into the internal thread 4, the exposed free end of which is in the form of a ball joint housing 17. The shank 5 extends all the way through the threaded sleeve 3. Thus, an end piece of the shank 5, which extends out of the threaded sleeve 3, is visible on the right side of the illustration in FIG. 1. On the side facing the opening of the tube 2, the threaded sleeve 3 has a coupling contour 6 which comprises slot-shaped recesses 8 which extend in the direction of the adjustment movement to be implemented between the tube 2 and the shank 5. An arm 28 of an adapter 7 engages in the slot-shaped recess 8 of the threaded sleeve 3, wherein the arm 28 can be displaced within the slot-shaped recess 8 of the threaded sleeve 3 easily and in a gliding manner. The arm 28, as a component of the adapter 7, therefore engages in a form-locking manner in the coupling contour 6 of the threaded sleeve 3. Furthermore, the special feature of the adapter 7 is that it is designed such that the dimensions thereof allow it to be displaced along the entire shank 5 independently of the thread. The adapter 7 is equipped with a tool placement surface 27 on a flange-type part thereof, thereby enabling it to be moved from the outer side of the structural unit using a suitable tool. The tube 2 also has a tool placement surface 12 on the external peripheral surface thereof, in order to provide the counterforce to the rotational motion. In the example shown, the tool placement surfaces 12 and 27 are designed such that each one can accommodate an open-end wrench. Furthermore, the entire structural unit is fixed using a locknut 11. The locknut 11 serves, in interaction with the adapter 7, to seal the structural unit and, in particular, the open end of the tube 2 against penetration by contaminants and moisture. It also fixes the components that can move relative to one another in the selected position. These measures can be enhanced multifold when, according to a further proposal of the invention, a self-locking locknut 11 is used as the locknut. The self-locking effect is usually attained via a plastic lining 35 within the thread of the nut 11, and therefore an additional sealing effect can be attained when such a locknut 11 is used for fastening. Additionally, since the length of the structural unit is usually adjusted manually, it is practical to provide a scale on the external peripheral surface of the tube 2 for use by the user who will perform the adjustment. The scale can be formed by markings 36.

Figure 2:
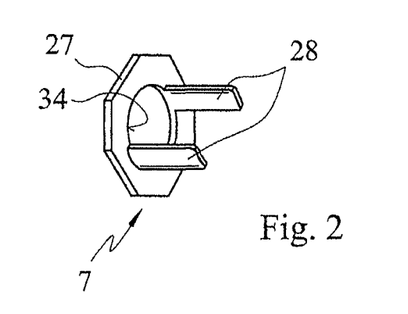
FIG. 2: shows an adapter as an individual part and in a perspective depiction.

FIG. 2 shows an adapter 7 that can be used in a structural unit according to FIG. 1. This adapter 7 has a tool placement surface 27 on a flange-type part. In addition, two arms 28 extend perpendicularly away from this surface. As shown in the depiction in FIG. 2, the inner surface of the arms 28 and the diameter of the through-hole 34 of the adapter 7 are equipped with a smooth surface, thereby enabling the adapter 7 to glide on the external thread of the shank 5.

Figure 3:
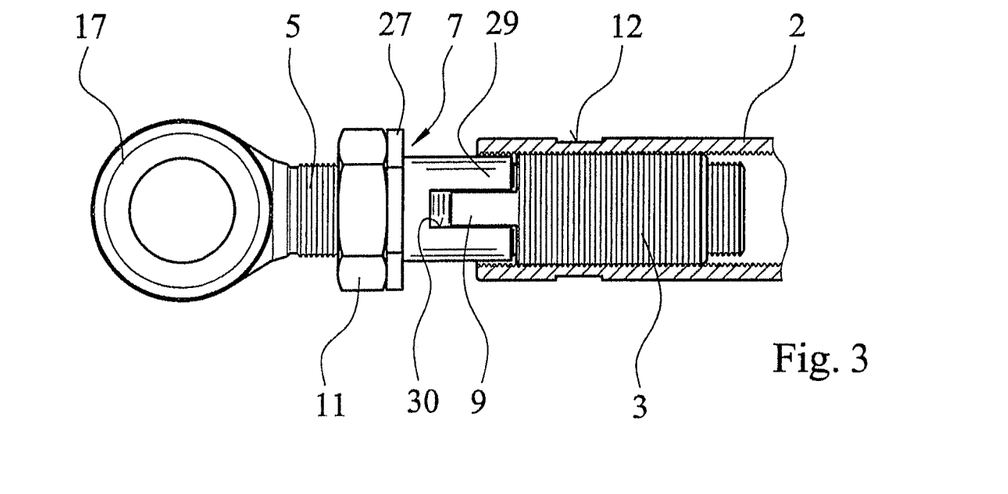
FIG. 3: shows a second variant of a structural unit according to the invention, in a sectional view.

FIG. 3 shows a variant having the same basic design as the structural unit shown in FIG. 1. The main differences are seen in the coupling contour 6 of the threaded sleeve 3 and the connection thereof to the adapter 7. For instance, the threaded sleeve 3 comprises a pin 9 that points in the direction of the opening of the tube 2 and leads into a slot 30 of the adapter 7. This slot 30 of the adapter 7 is formed in the peripheral surface 29 of the adapter 7. The adapter 7 shown in FIG. 3 also has a flange-type expansion, on the outer circumference of which a tool placement surface 27 is formed.

Figure 4:
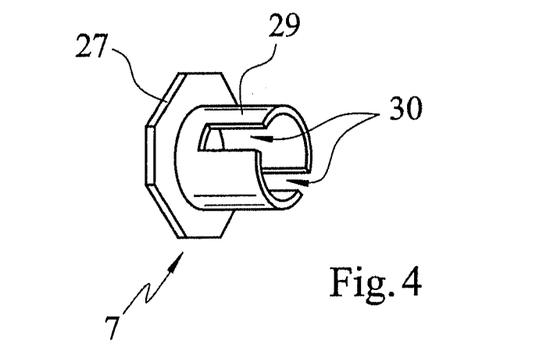
FIG. 4: shows an adapter, which is suitable for the variant of FIG. 3, as an individual part and in a perspective view.

The adapter 7 is shown more clearly in FIG. 4 than in FIG. 3. It clearly shows the design of the adapter 7 which comprises two diametrically opposed slots 30 within a peripheral surface 29 which is otherwise designed as a closed peripheral surface having a circular cross section. The previously mentioned tool placement surface 27 is located on the flange—type part of the adapter 7.

Figure 5:
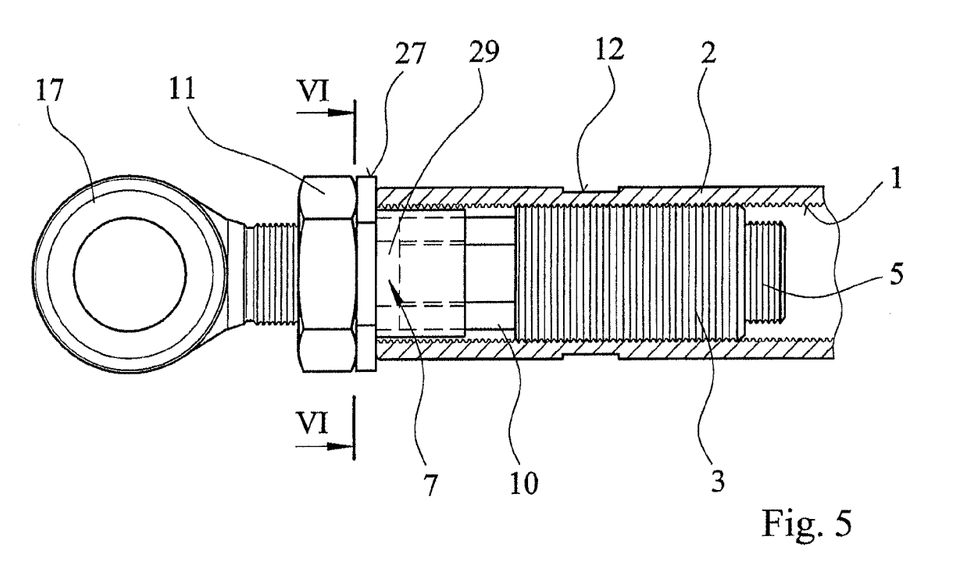
FIG. 5: shows a sectional view of a further variant embodiment of a structural unit according to the invention.

A further embodiment of a structural unit according to the invention is shown in FIG. 5, in a sectional view. The special feature of this variant is that the threaded sleeve 3 has a polygonal contour 10 on the side facing the end of the tube 2. Corresponding thereto, the adapter 7 also has a complementary polygonal contour on the inner side of peripheral surface 29 thereof. The flange-type expansion of the adapter 7, which serves to seal the tube 2 in this example as well, likewise has an above-described tool placement surface 27.

The embodiment shown in FIG. 5 makes it possible to use an adapter as well as a special tool key which can be placed onto the polygonal contour 10 of the threaded sleeve 3. In order to make contact with the polygonal contour 10, the tool key must be inserted into the open end of the tube 2, however. This would have to be taken into account for a variant embodiment that would not include the adapter 7 shown here.

Figure 6:
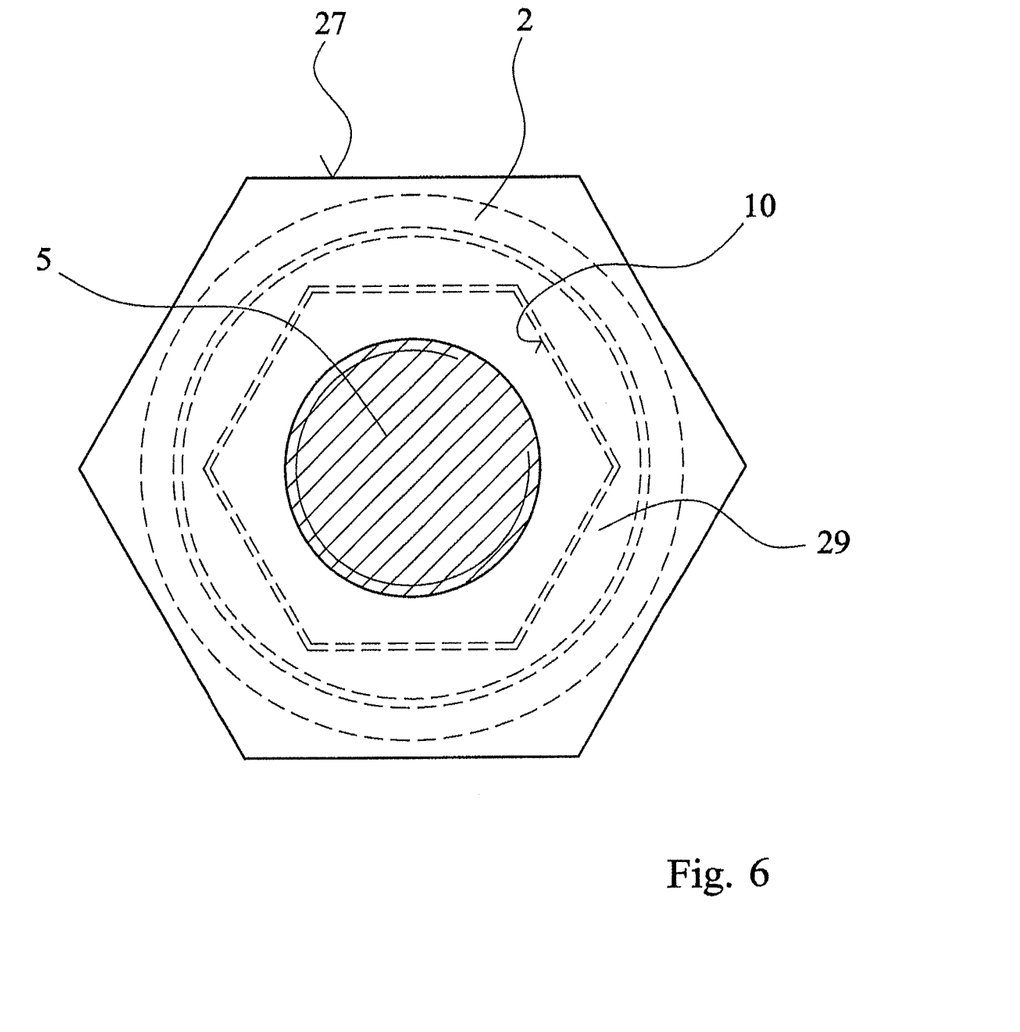

The section line VI-VI from FIG. 5 is shown in FIG. 6. The engagement of the individual components is shown clearly in this case as well. The threaded sleeve 3 is screwed onto the shank 5 via the internal thread thereof. It has the polygonal contour 10. The polygonal contour 10 is enclosed by the corresponding peripheral surface 29 of the adapter 7, thereby permitting longitudinal movement in the sense of a displacement of the adapter 7 on the polygonal contour 10. This potential movement is thread-independent in this case as well. The tool placement surface 27 is present on the outer surface on the flange-type expansion of the adapter 7.

Figure 7:
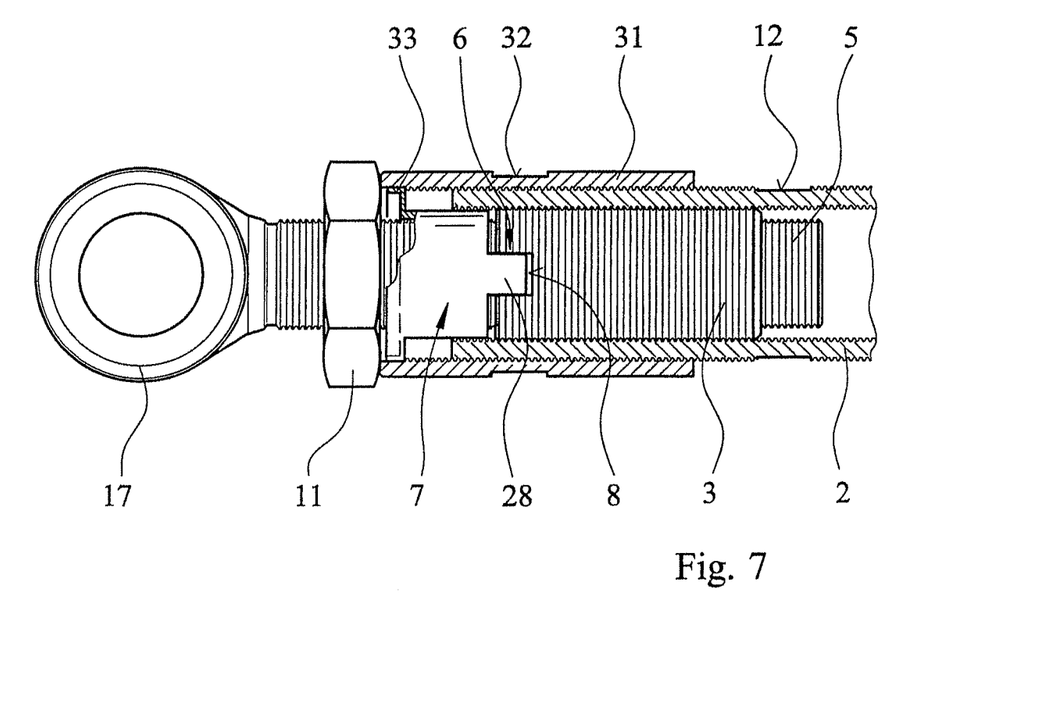

A further example of a structural unit according to the invention is depicted in FIG. 7. The threaded sleeve 3, which has been screwed into the tube 2, has a coupling contour 6 comprising a slot-shaped recess 8 on the side facing the end of the tube 2. An arm 28 of the adapter 7 engages in a gliding manner in this slot-shaped recess 8 of the threaded sleeve 3. The special feature of the solution shown in FIG. 7 is that the part of the adapter 7 designed as flange 33 is fixedly connected to a sleeve 31 which has been screwed onto the external peripheral surface of the tube 2, for the purpose of which the tube 2 has a thread corresponding to the sleeve 31 along a section of the external peripheral surface thereof. The connection between flange 33 and sleeve 31 can be a bonded connection or can be established using press fit or an interference fit. Thus, the adapter 7 and, therefore, the threaded sleeve 3, can be displaced within the tube 2 by displacing the sleeve 31 on the outer circumference of the tube 2. The locknut 11 is used here as well to fix the components relative to one another, and also serves to seal the structural unit against penetration by contaminants. Moreover, a tool placement surface 32 is provided on the external peripheral surface of the sleeve 31.

Figure 8:
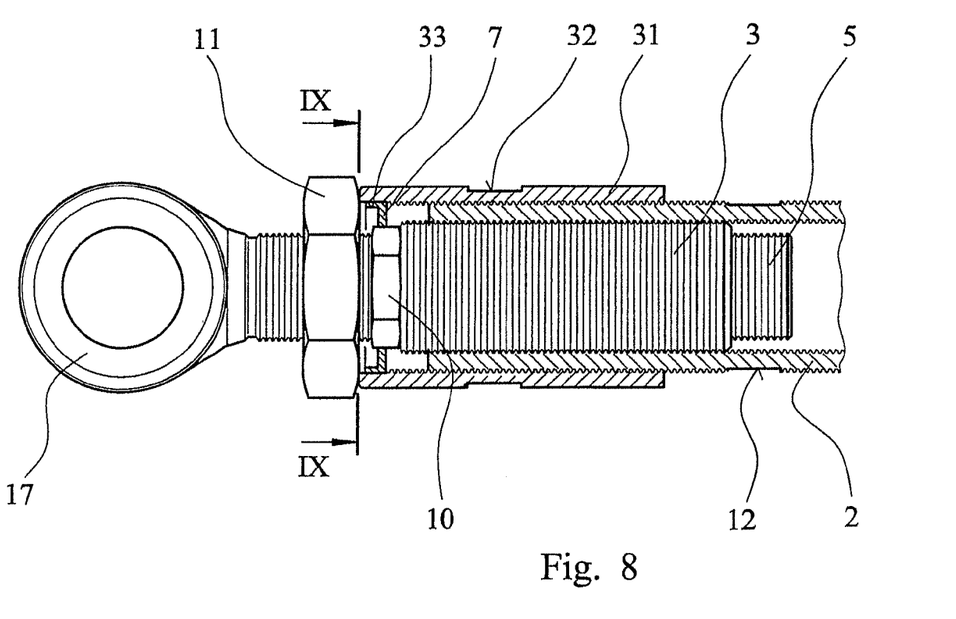
FIG. 8: shows a further variant embodiment of a structural unit according to the invention, in a sectional view.

FIG. 8 shows an embodiment, in a sectional view, in which a polygonal contour 10 is formed on the threaded sleeve 3 on the opening side of the tube 2. Corresponding to this polygonal contour 10 is a complementary inner contour of the adapter 7. The adapter 7 therefore glides along the longitudinal extension of the polygonal contour 10 of the threaded sleeve 3 during the displacement movement and likewise transfers the rotational motion via this polygonal contour 10. The adapter 7 comprises a flange 33 in this variant solution as well, which is fixedly connected to a sleeve 31 which has been screwed onto the external peripheral surface of the tube 2. The sleeve 31 and the tube 2 have tool placement surfaces 12 and 32 in the manner described above. A locknut 11 on the external thread of the shank 5 serves to seal and fix the components.

Figure 9:
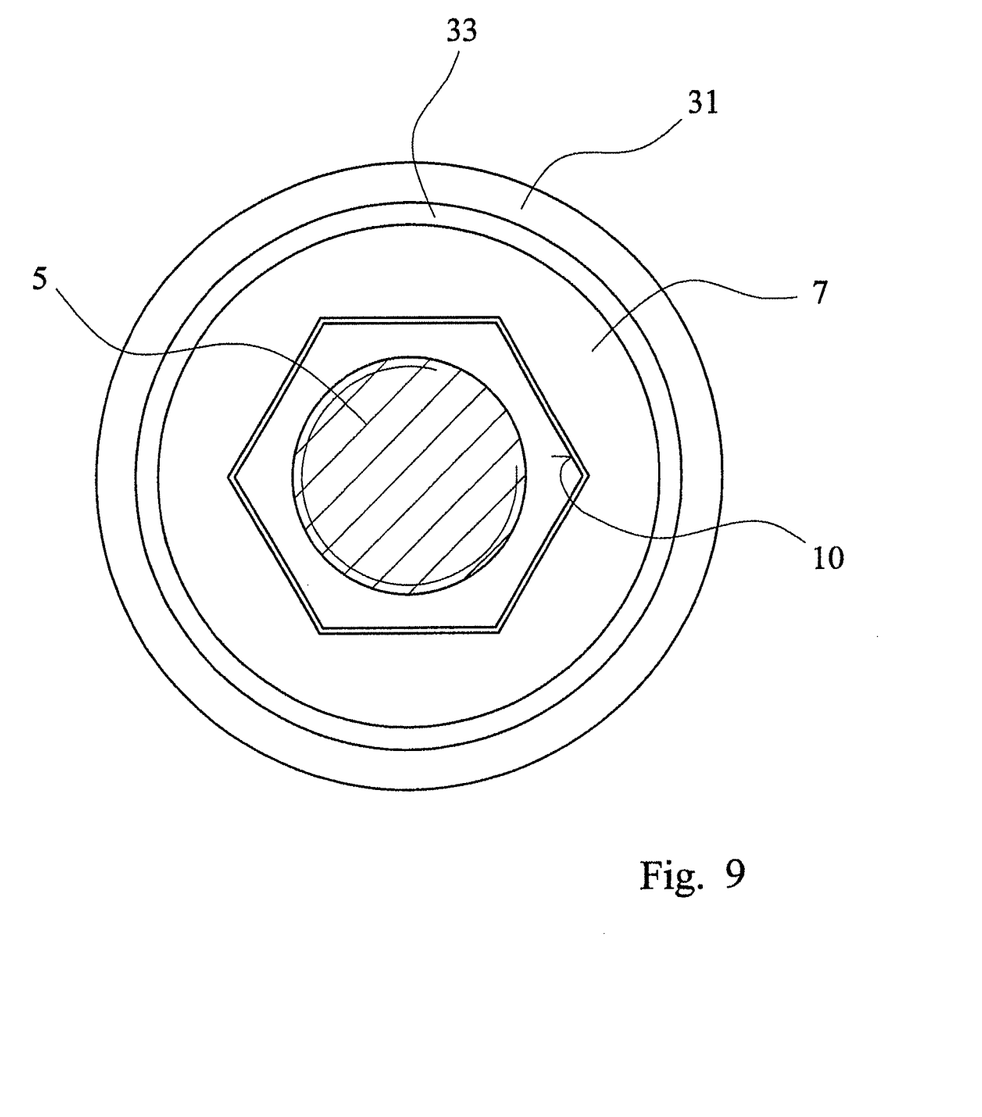
FIG. 9: shows the section line IX-IX from FIG. 8, FIG. 10: shows a first tool in a perspective view, depicted as an individual part.

The section line IX-IX from FIG. 8 is shown in FIG. 9. Clearly, the threaded sleeve 3 has been screwed onto the shank 5 and interacts with the polygonal contour 10 thereof via the corresponding contour of the internal peripheral surface of the adapter 7. The flange 33 of the adapter 7 is fixedly connected to the sleeve 31.

Figure 10:
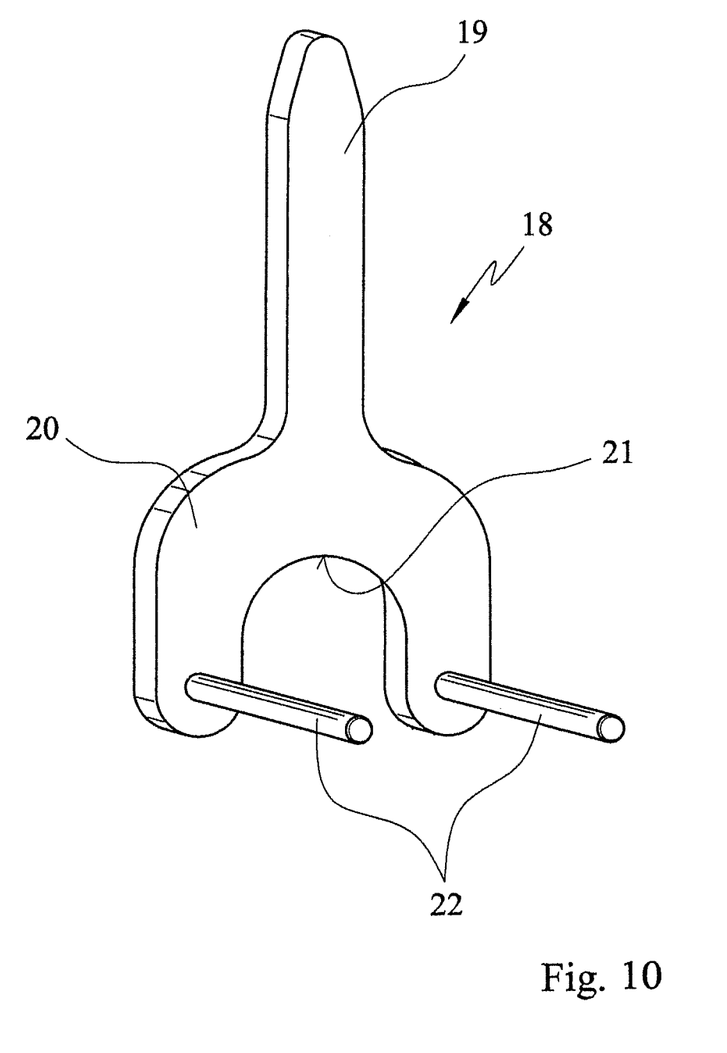

FIG. 10 shows, as an example, a tool for the manual actuation and adjustment of a structural unit according to the invention. This tool, which is labeled in entirety with 18, comprises a handle 19 which transitions into a key surface 20. The key surface 20 has a cycloidal—and semicircular in this case—recess 21 in the center. The tool 18 comprises two pins 22 which extend at a right angle away from the key surface 20 and can be engaged with the coupling contour of the threaded sleeve, while the semicircular recess 21 is placed onto the external thread of the shank in a gliding manner. The handle 19 of the tool 18 is used for manual operation.

Figure 11:
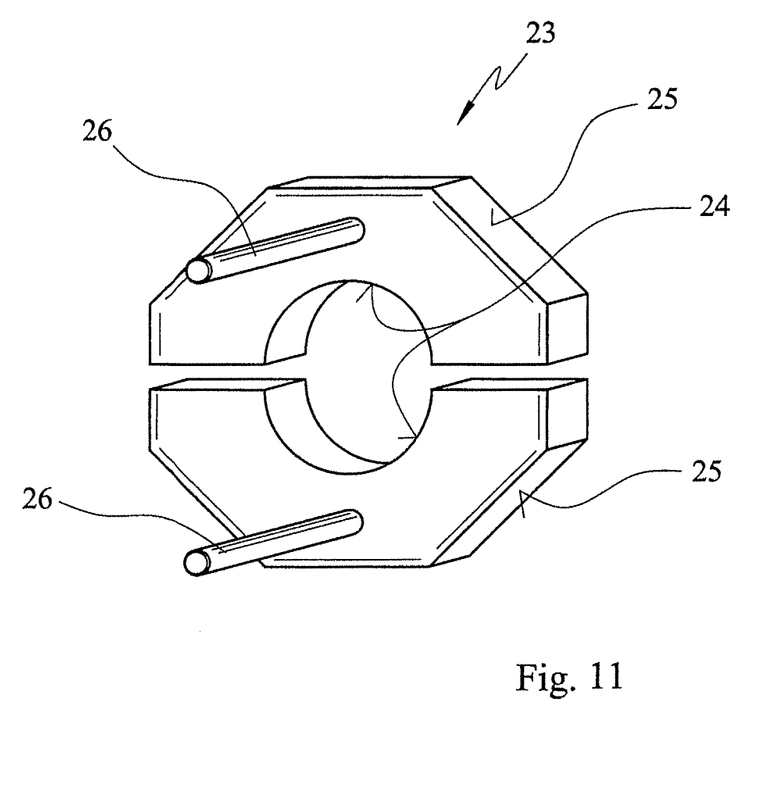
FIG. 11: shows a second tool in a perspective view, as an individual part

A further tool for the application of a method according to the invention is shown in FIG. 11. This two-part tool 23 also comprises, on each half, a cycloidal recess 24 which is semicircular in the present case, which is placed onto the thread of the shank 5, as in the example explained above, and can be guided thereon in a gliding manner. The external peripheral surface of the tool 23 has a tool placement surface 25 which, in this case, was designed similarly to a hexagonal nut overall, and which is produced when both tool halves are placed onto the shank 5, thereby enabling an open-end wrench to be placed on the tool. Two pins 26 which can engage in a corresponding coupling contour 6 of the threaded sleeve 3 extend perpendicularly away from the surface of the tool 23.

Figure 12:
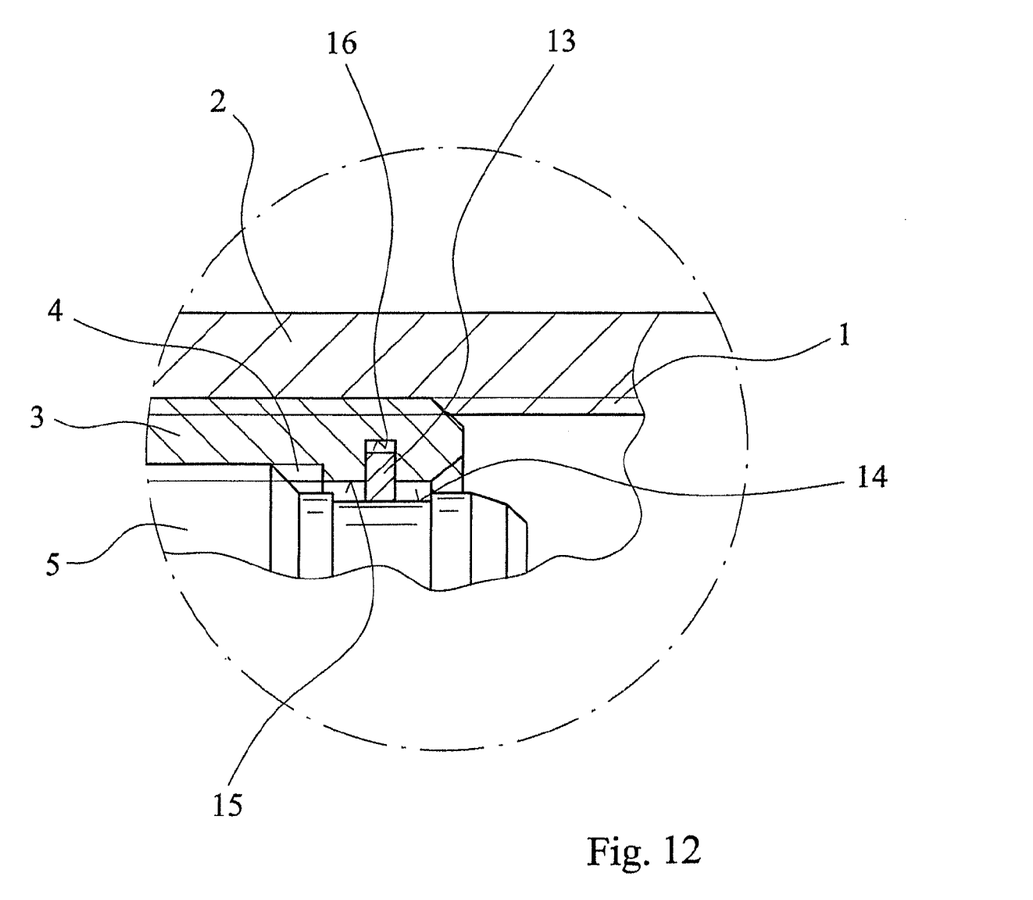
FIG. 12: shows a section of a cut through the end region of the shank.

FIG. 12 shows, as an example, one possibility for integrating a limitation of the adjustment travel into a structural unit according to the invention. It is thereby also made possible to prevent the components from being separated from each other due to improper handling. The end piece of the shank 5 has a special design for this purpose. First, the outer contour thereof is shaped as a mushroom cap. This mushroom-cap-shaped expansion comprises a groove 14 in the shank 5. A blocking element 13, which is annular in this case, glides along the surface of the groove 14. Thus, the groove 14 is also circumferential on the end of the shank 5 located inside the tube. On the side opposite the groove 14, the blocking element 13 is inserted into a further groove 16 in the threaded sleeve 3. In this case, the groove 16 is designed such that the blocking element 13 has only slight axial play, that is play in the longitudinal direction of the structural unit. However, the blocking element 13 has sufficient radial play within the groove 16. The radial play is required so that the blocking element 13, which has limited elasticity, can be slid over the mushroom-cap-shaped expansion of the end section of the shank 5 during initial assembly, and therefore, once the mushroom-cap-shaped expansion of the shank end has been passed over, the blocking element 13 snaps into the groove 14 of the shank 5. It returns to its original shape due to its elasticity. In the shank end 5, the groove 14 has an axial extension in the longitudinal direction of the shank 5, thereby ensuring the required adjustment travel of the threaded sleeve 3 within the structural unit.

LIST OF REFERENCE CHARACTERS 1 internal thread (tube)
2 tube
3 threaded sleeve
4 internal thread (threaded sleeve)
5 shank
6 coupling contour
7 adapter
8 slot-shaped recess
9 pin
10 polygonal contour
11 locknut
12 tool placement surface
13 blocking element
14 groove (in the shank)
15 internal peripheral surface (of the threaded sleeve)
16 groove (in the threaded sleeve)
17 ball joint housing
18 tool
19 handle
20 key surface
21 semicircular recess 22 pin
23 tool
24 recess
25 tool placement surface
26 pin
27 tool placement surface
28 arm
29 peripheral surface
30 slot
31 sleeve
32 tool placement surface
33 flange
34 through-hole

The invention claimed is:

1. A tie rod for a motor vehicle comprising:
a tube (2) being provided with an internal thread (1), on at least one surface thereof, which is threaded in a first rotational direction;
a threaded sleeve (3) having an external thread that mates with the internal thread of the tube, the threaded sleeve being screwed into an end section of the tube (2);
the threaded sleeve (3) having an internal thread (4) which is threaded in a second direction opposite to the first rotational direction of the internal thread (1) of the tube (2), a shank (5) having an external thread that mates with the internal thread of the threaded sleeve, the shank is screwed into the threaded sleeve;
the threaded sleeve (3) being accommodated entirely within the end section of the tube (2) such that the external thread of the threaded sleeve mates with the internal thread threaded in the first rotational direction and the internal thread threaded in the second rotational direction mates with the external thread of the shank;
an adaptor being axially aligned with the threaded sleeve and having a first end that is arranged radially between the tube and the shank, the first end of the adaptor engages the threaded sleeve such that the adaptor and the threaded sleeve are rotationally fixed and axially slidable with respect to each other, a second end of the adaptor being located adjacent an opening of the tube through which the tube passes; and
the tube (2) being axially clamped by a locknut to the shank (5) of a ball joint housing (17) which is screwed into the threaded sleeve (3).

2. The tie rod for a motor vehicle according to claim 1, wherein an opening of the end section of the tube (2), which annularly encloses the shank (5), is closed by one of the locknut (11) directly and an intermediate connection of a locking element.

3. The tie rod for a motor vehicle according to claim 1, wherein the threaded sleeve (3) has a coupling contour (6) on an opening of the end section of the tube (2).

4. The tie rod for a motor vehicle according to claim 3, wherein the coupling contour (6) of the threaded sleeve (3) forms one of a tool placement surface and a tool engagement surface.

5. The tie rod for a motor vehicle according to claim 4, wherein the coupling contour (6) of the threaded sleeve (3) comprises one of:
at least one slot-shaped recess (8);
at least one pin (9) formed on the threaded sleeve (3); and
a section having a polygonal contour (10).

6. The tie rod for a motor vehicle according to claim 3, wherein the coupling contour (6) of the threaded sleeve (3) is a contour that receives the first end of the adapter for a mutual, form-locking engagement of the threaded sleeve (3) with the adapter (7), the second end of the adaptor extends through the opening of the tube and comprises a tool engagement surface which abuts the end section of the tube to limit axial movement of the adaptor, the locknut is adjustable to lock the adaptor against the end section of the tube.

7. The tie rod for a motor vehicle according to claim 6, wherein the adapter (7) is axially displaceable between the shank (5) and the tube (2), and is not engaged by a thread.

8. The tie rod for a motor vehicle according to claim 6, wherein outer dimensions of the adapter (7) are smaller, at least in sections, than inner diameter of the internal thread (1) of the tube (2), and inner dimensions of the adapter (7) are greater across an entire length of the adapter than an outer diameter of the external thread of the shank (5).

9. The tie rod for a motor vehicle according to claim 6, wherein the adapter (7) is fixedly connected to a sleeve (31) which is screwed onto an external thread of the tube (2) and has a tool placement surface (32) on an external peripheral surface thereof.

10. The tie rod for a motor vehicle according to claim 6, wherein of the tool engagement surface is a flange on the second end of the adapter (7) and when the locknut is in a locked position the flange is sandwiched between the end section of the tube (2) and the locknut (11).

11. The tie rod for a motor vehicle according to claim 10, wherein the locknut (11) is one of self-locking and is equipped with a locking element.

12. The tie rod for a motor vehicle according to claim 3, wherein the coupling contour (6) of the threaded sleeve (3) comprises at least one slot-shaped recess (8) which is engageable by one of a tool (18) and arms on the first end of the adaptor (7).

13. The tie rod for a motor vehicle according to claim 1, wherein a tool placement surface (12) is formed on an external peripheral surface of the tube (2) and the adaptor has a tool engagement surface that is radially exposed to an exterior of tube to facilitate engagement of a tool therewith.

14. The tie rod for a motor vehicle according to claim 1, wherein markings, which form a scale, are provided on an external peripheral surface of the tube (2) for adjusting a length of the tie rod.

15. The tie rod for a motor vehicle according to claim 1, wherein the internal thread (1) of the tube (2) has a defined length in order to limit axial travel of the threaded sleeve (3).

16. A tie rod for a motor vehicle comprising:
a tube (2) being provided with an internal thread (1), on at least one surface thereof, which is threaded in a first rotational direction;
a threaded sleeve (3) being screwed into an end section of the tube (2);
the threaded sleeve (3) having an internal thread (4) which is threaded in a second direction opposite to the first rotational direction and into which a shank (5) is screwed;
the threaded sleeve (3) being accommodated entirely within the end section of the tube (2);
the tube (2) being exclusively fastened, via an axial clamping, to the shank (5) of a ball joint housing (17), which is screwed into the threaded sleeve (3), using a locknut (11); and
the threaded sleeve (3) comprises a blocking element (13) through which the shank (5) extends, and which is accommodated in a groove (14) formed on an external peripheral surface of the shank (5) such that axial travel thereof is limited, and the blocking element (13) is inserted into a groove (16) formed in an internal peripheral surface (15) of the threaded sleeve (3).

17. The tie rod for a motor vehicle according to claim 16, wherein the groove (14) formed on the external peripheral surface of the shank (5) and the groove (16) formed in the internal peripheral surface (15) of the threaded sleeve (3) extend circumferentially along one of the external peripheral surface of the shank (5) and along the internal peripheral surface (15) of the threaded sleeve (3).

18. A tie rod for a commercial vehicle, the tie rod comprising:
- a tube (2) comprising an end having an internal thread (1) which is threaded in a first rotational direction;
- a threaded sleeve (3) having an external thread which mates with the internal thread (1) threaded in the first rotational direction, the threaded sleeve (3) having an internal thread (4) which is threaded in a second opposite rotational direction to the first rotational direction, the threaded sleeve (3) being threaded into the end of the tube (2) such that the external thread of the threaded sleeve (3) engages with the internal thread (1) of the tube (2) and the threaded sleeve (3) is entirely accommodated within the end section of the tube (2);
- a shank (5) having an end comprising a ball joint housing (17) and an end opposite the ball joint housing (17) which is screwed into the threaded sleeve (3)
- an adaptor that is radially arranged between the shank and the internal thread of the tube, the adaptor has a radially extending flange and axially extending engagement members, the engagement members of the adaptor engage the threaded sleeve so as to prevent relative rotation and permit relative axial movement therebetween; and
- a locknut (11) being threadably coupled to the shank, such that rotation of the locknut in relation to the shank axially biases the locknut to and fro along the shank, rotation of the locknut toward the tube axially axially locks the flange of the adaptor against the end of the tube (2).

* * * * *